United States Patent [19]

Hair

[11] Patent Number: 4,506,630

[45] Date of Patent: Mar. 26, 1985

[54] APPARATUS FOR SUSTAINED DISPENSATION OF A CHEMICAL AGENT EXTERIORALLY OF AN ANIMAL

[76] Inventor: Jakie A. Hair, Rte. 5, Box 188A, Stillwater, Okla. 74074

[21] Appl. No.: 428,641

[22] Filed: Sep. 30, 1982

[51] Int. Cl.³ .............................................. A01K 29/00
[52] U.S. Cl. .................................... 119/156; 119/157; 40/301
[58] Field of Search ................. 119/156, 157; 40/300, 40/301, 302, 303, 304; 222/196.4; 239/34

[56] References Cited

U.S. PATENT DOCUMENTS

| | | | |
|---|---|---|---|
| 1,921,821 | 8/1933 | Higgins | 239/34 |
| 2,239,628 | 4/1941 | Seki | 239/34 |
| 2,417,273 | 3/1947 | Staab | 222/196.4 |
| 2,777,421 | 1/1957 | Hiebert | 119/157 |
| 3,213,830 | 10/1965 | Wiesemann | 119/157 |
| 3,357,122 | 12/1967 | Hayes | 40/301 |
| 3,388,492 | 6/1968 | Nichols | 40/301 |
| 3,935,839 | 2/1976 | Goodwin | 119/157 |
| 4,023,532 | 5/1977 | Goodwin | 119/156 |

Primary Examiner—Gene Mancene
Assistant Examiner—Kris R. Schulze
Attorney, Agent, or Firm—Head, Johnson & Stevenson

[57] ABSTRACT

Apparatus for sustained dispensation of a chemical agent exteriorally of an animal, the chemical agent being such as a pesticide, insect repellent, or other pharmacological agent and being contained in a closed vial, including apparatus for retaining the vial on the exterior of an animal's body and an element forming a part of the vial for sustained minute release of the chemical agent.

9 Claims, 12 Drawing Figures

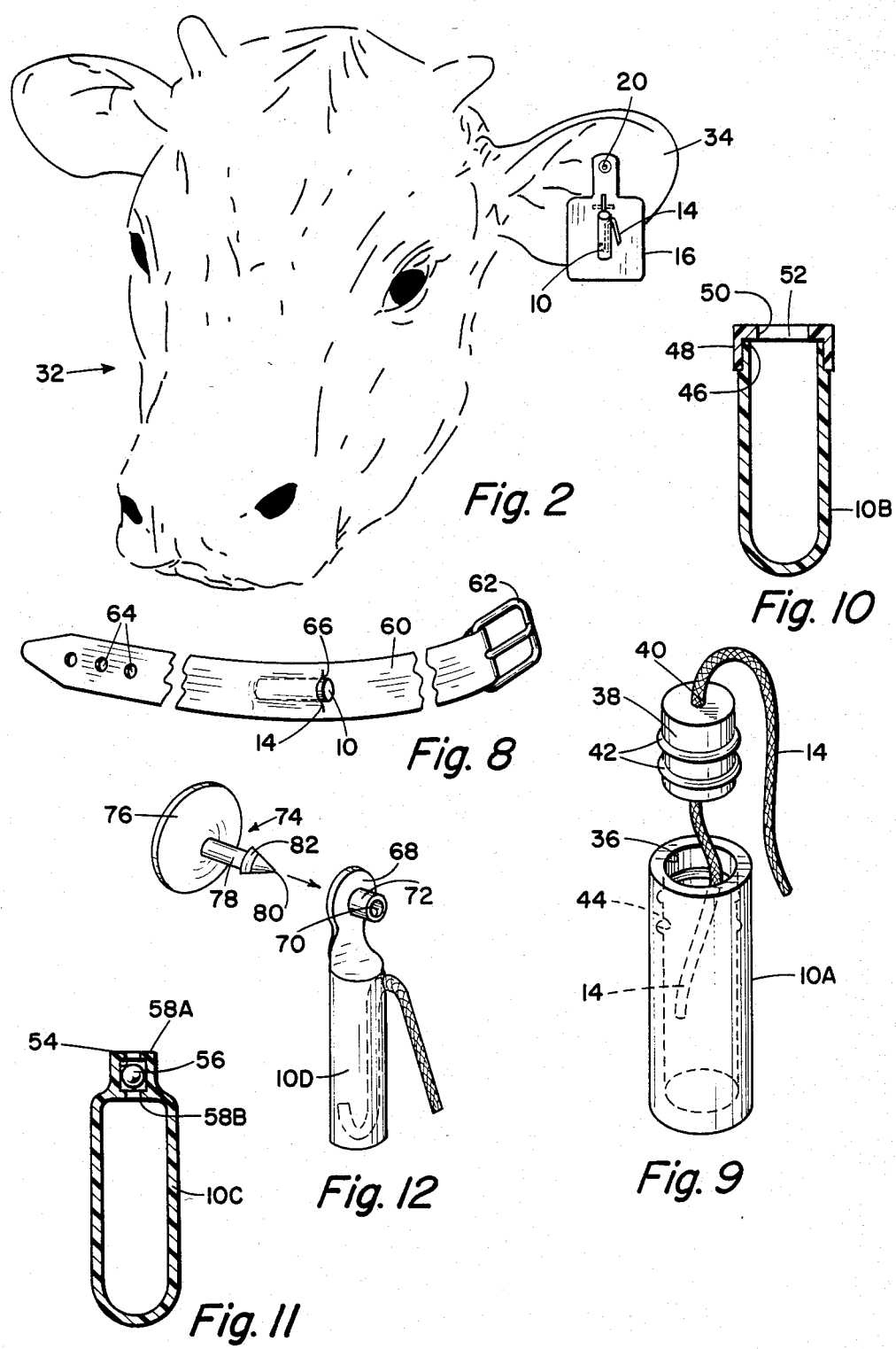

APPARATUS FOR SUSTAINED DISPENSATION OF A CHEMICAL AGENT EXTERIORALLY OF AN ANIMAL

SUMMARY OF THE INVENTION

An effective means of controlling pests on animals is by the sustained release of insecticides or repellents. For this purpose, a large industry has developed for the manufacture and distribution of such externally applied insect repellents and insecticides. For small animals such as dogs and cats, the most common type of device for dispensing a chemical agent exteriorly of an animal's body is by means of a collar which has been saturated or otherwise impregnated with the chemical agent. Such collars are frequently employed by owners of dogs and cats to reduce fleas and ticks on their animals.

For larger animals, and particularly cattle wherein ectoparasites can become a serious problem, particularly arthropods which infest the ears, a common means of dispensing repellent agents is by the use of ear tags. For examples of the use of ear tags for this purpose, reference may be had to previously issued U.S. Pat. Nos. 4,184,453; 4,059,074; 3,756,200; 3,942,480; 3,949,708 and 3,405,688. While this list is not by any means exhaustive, it is indicative of devices for attachment to animals for purposes of providing an insect repellent means.

The problem with dispensing a chemical agent by means of a collar, tag, or the like, is that the dispensation is inefficient and irregular. Some plastics, of which such ear tags and collars are made, have the capacity to absorb and release chemicals, but the volumetric quantities of chemical agent dissipated from a tag or a collar is exceedingly small. In addition, these type devices do not release chemical at a steady rate. Instead, when an ear tag or collar is fresh, the amount of chemical released is much greater than after it has been in use for several weeks or months.

The present invention provides an improved means of dispensing chemical agents on the exterior body of an animal by providing a closed vial containing the desired chemical agent. The chemical agent is typically contained in the form of a liquid or a solid having high vapor pressure. The vial includes a means for dispensing minute amounts. One such means includes the use of a wick which extends sealably through the vial with a portion of the wick being inside the vial and a portion outside the vial. Small quantities of the content of the vial pass exteriorally of the vial through the wick. By selecting the diameter and characteristics of the wick, as well as the length which is subjected to the chemical within the vial and the length which is exteriorally of the vial, the rate of dispensation of the chemical agent can be accurately controlled. Further, such method dispenses chemical agent at a substantially constant rate over a relatively long period of time.

Another method disclosed in the invention is the provision of a membrane wettable by the chemical agent. The chemical passes through the membrane by osmosis to be carried to the exterior of the animal's body. Such device also has a relatively constant rate of dispensation of the chemical agent. Another means is the provision of a valve arrangement permitting only small minute quantities of chemical to pass therethrough.

The invention provides means for attaching the chemical containing vial to an animal such as improved means of attaching the vial to an ear tag or to a collar.

DESCRIPTION OF THE DRAWING

FIG. 2 shows, in dotted outline, the head of a bovine having an ear tag affixed to the animal's ear supporting a chemical dispensing vial as employed in this invention.

FIG. 8 shows a collar which may be placed around the neck of an animal, and particularly of a dog or cat, the collar having a pouch therein which receives a chemical containing vial.

FIG. 9 is an isometric view of a vial having an open top and a stopper which sealably receives a wick showing one means of producing a chemical dispensing vial as employed in the invention.

FIG. 10 is a cross-sectional view of a chemical containing vial having a cap with an opening therethrough and having a wettable membrane closing the opening, the membrane serving as means of dispensing the contents of the vial.

FIG. 11 is a cross-sectional view of a vial as employed in this invention having a cylindrical passageway through the wall thereof and having a spherical member in the passageway functioning as a valve for the minute disposition of the contents of the vial.

FIG. 12 is an isometric view of an additional means of attaching the chemical-containing vial of this invention to the ear of an animal. The vial includes an integral planar portion having an opening therethrough which receives an elongated pin member having a pointed end which can be forced through the ear of an animal and thence through the opening in the vial planar member. The pointed end is enlarged so that the vial is retained on the pin member after it passes through the vial planar portion.

DETAILED DESCRIPTION

Figure 1:
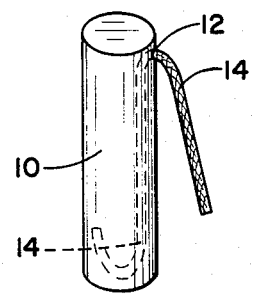
FIG. 1 is an isometric view of a vial as may be employed by the principles of this invention to dispense a chemical agent, the vial having a wick which extends sealably through the wall of the vial.

Referring to the drawings and first to FIG. 1, an important element used in the practice of the invention is illustrated. It is understood that the actual configuration of the device employed to practice the invention may have appearances completely dissimilar from the objects illustrated herein for purposes of explaining the invention while nevertheless the principles of such devices may, nevertheless, be according to the teachings which will now be set forth. As previously indicated, the dispensation of chemicals by means of a plastic member is not completely successful because of the inefficiency of dispensation and the fact that it is not dispensed at a uniform rate. The present invention employs the use of a container such as vial 10 containing a chemical agent. The vial may be of plastic, glass, metal, or the like. The vial 10 can be relatively small, particularly when used on a collar for dogs or cats in a manner to be described subsequently, or larger when used on an ear tag or in other ways for a large animal such as a bovine.

The vial 10 as illustrated in FIG. 1 is completely enclosed except for a small opening 12 which sealably receives a wick 14. A portion of the wick is within the interior of the vial 10 and a portion exterior of the vial. The amount of chemical dispensed by wick 14 will depend upon the diameter of the wick, the characteristic of it, that is, the material of which it is made, the size of the strands, the formation of the strands whether woven, braided, twisted or the like, the length of the wick within the interior of the vial 10, and the length of the wick exteriorly of the vial. By decreasing the lengths of the wick inside and outside the vial, the rate of dispensation of the chemical can be changed. Of course, the viscosity and wettability of the chemical is also relevant, both of which factors may be preselectably controlled. By the proper selection of the characteristics of the chemical and the diameter, length and characteristics of wick 14, the rate of dispensation of chemical from the vial 10 may be made to extend for an exceedingly long period, such as several months. In addition, it can be seen that the rate of dispensation will remain substantially constant as long as liquid chemical exists within the vial. The vial 10 may be very small, such as ½ to ¾ of an inch in length and 3/16 to ¼ in diameter, particularly when employed for domestic animals like dogs and cats, or it can be relatively large, such as 1½ to 3 inches in length and ⅜ to ½ inch in diameter for use on animals. Even larger and smaller dimensions may be appropriate.

Figure 7:
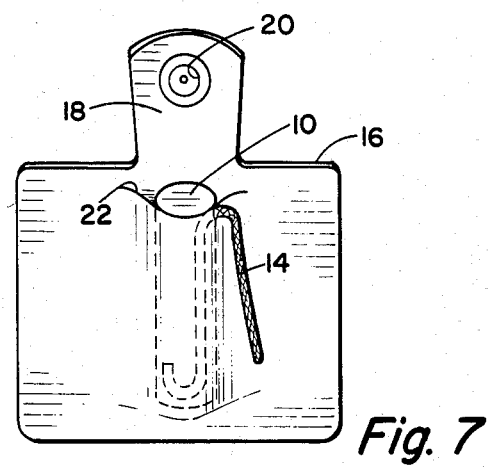
FIG. 7 shows an ear tag having a pouch therein for receiving the vial of the type shown in FIG. 1.

FIG. 7 shows the vial 10 of FIG. 1 attached to an ear tag 16. The use of ear tags as a means of combating infestation of ectoparasites on animals is well-known, such as revealed in the prior issued patents previously mentioned. Ear tag 16 typically includes a large planar portion and a reduced width neck portion 18 with a means 20 such as an opening through the neck portion 18 by which the ear tag can be attached to an animal's ear. In the arrangement of FIG. 7 the ear tag 16 includes a pouch 22 which contains vial 10, with the wick 14 extending exteriorally of the pouch. This arrangement has the advantage that when the contents of the vial 10 have been dispensed, a new vial may be inserted in the pouch 20.

Figure 4:
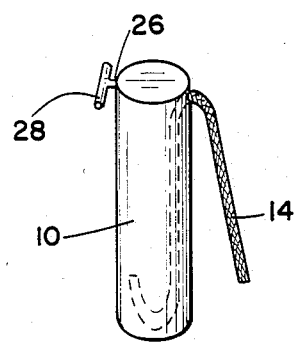
FIG. 4 shows a type of vial having an attachment device extending from it as employed with the ear tag of FIG. 3.
Figure 3:
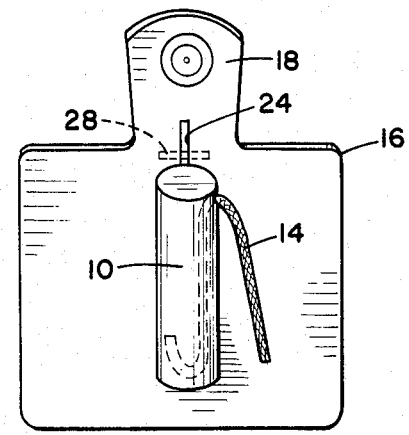
FIG. 3 shows an ear tag such as employed in FIG. 2 showing one means whereby the chemical dispensing vial may be attached to the ear tag.

FIGS. 3 and 4 disclose an alternate means wherein a chemical-containing vial may be affixed to an ear tag. In this embodiment the ear tag has a vertical elongated narrow slot 24 formed in it. The vial, as shown in FIG. 4, includes an integral attachment member having a portion 26 which is of diameter substantially equal to the width of slot 24 and an outer elongated portion 28 which has a width in one dimension substantially equal to or less than slot 24. The elongated portion 28 can be inserted in the slot, and then the vial is orientated in such a way that it normally causes the elongated portion 28 to be transverse of the slot as illustrated in dotted outline in FIG. 3 so that the vial is retained on the ear tag. To replace the vial the attachment portion 26, 28 can be removed either by merely jerking it off or by passing the portion 28 back through the slot, and a new vial attached. The attachment portion 26,28 of FIG. 4 is illustrated as being integrally formed with vial 10 such as if vial 10 is formed of a moldable plastic. It can be seen that the attachment portion 26,28 may be otherwise independently secured as a separate element to the vial.

Figure 6:
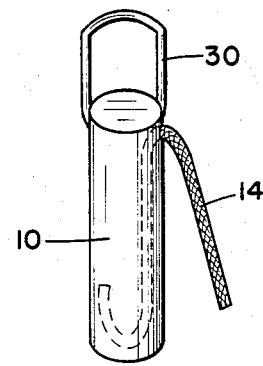
FIG. 6 shows the vial with the integral circumferential flexible band which is received on the neck portion of the ear tag by which the vial is retained on the ear tag.
Figure 5:
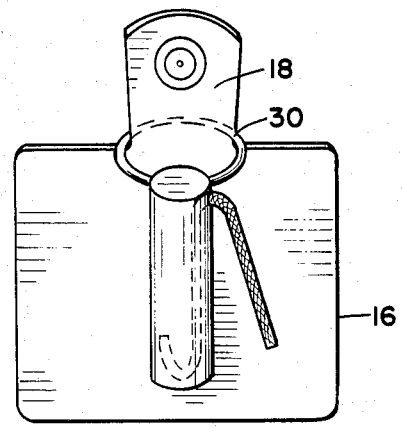
FIG. 5 shows a different means of attaching a chemical containing vial to an ear tag.

FIGS. 5 and 6 show another method of attaching the vial to an ear tag. In this arrangement the vial 10 has a circumferential band 30 which may be formed integrally with the vial when it is of a moldable plastic construction. If not of such construction the band 30 may be attached to the vial as an ancillary item. The band 30 can then be placed around the neck portion 18 of an ear tag 16 as shown in FIG. 4 to secure it to the ear tag.

FIG. 2 shows the head of a cow 32 in dotted outline with a tag 16 affixed to the cow's ear 34. The vial 10 containing the chemical agent is secured to the tag 16 in a manner as described with reference to FIGS. 3 and 4.

The FIGS. 1–7 show arrangements in which the vial is integrally formed and sealed with wick 14 therein without an independent closure member. FIG. 9 shows the arrangement in which the vial 10A has an open top 36. A stopper 38 has an opening 40 through it which receives the wick 14. The stopper 38 includes integral formed O-ring gaskets or grooves to receive separate O-rings 42. To ensure retention of the stopper, the interior of the vial may be formed with circumferential internal grooves 44. The particular stopper and vial arrangements of FIG. 8 is exemplary of the fact that the invention may be employed utilizing a vial having a removable closure.

While the use of a wick is a superior means of dispensing a chemical composition at a minute release rate, other means may be employed. For instance, FIG. 10 shows a vial 10B having an open top 46. A cover 48 is secured to the top of the vial, the cover having an opening 50 therethrough. Closing the open end 46 of the vial is a membrane 52. The membrane is of a material which is wettable by the chemical agent contained within the vial 10B. Thus the chemical agent does not flow through the membrane but serves only to saturate it, and the rate of disposition will be predicated upon the rate of evaporation of the chemical from the external surface of membrane 52. By properly selecting the characteristics, thickness and diameter of the membrane as well as the wettability of the chemical agent, the rate of dispensation of the chemical by the arrangement of FIG. 10 can be controlled. In addition, it can be seen that the rate of dispensation will be substantially constant as long as chemical exists within the vial to cause a wetting of the membrane.

FIG. 11 shows a still different arrangement for dispensing minute quantities of chemical agent. An internal cylindrical conduit 54 through the wall communicates between the interior and exterior of vial 10C. Positioned within the conduit 54 is a spherical member 56. A means is provided to retain the spherical member 56 within the conduit such as the reduced diameter ledges 58A and 58B. The spherical member 56 is of substantially the same external diameter as the internal diameter of conduit 54; thus fluid cannot flow past the spherical member 56 but as movement of the spherical member takes place within the conduit, minute quantities of chemical will be transferred from the interior to the exterior of the vial. This can be occasioned by the rotation of the spherical member 56 or its longitudinal movement within the cylindrical conduit 54. The valve arrangement of FIG. 11 is exemplary of valving mechanisms which may be employed to release minute quantities of chemical from a vial.

FIG. 8 shows a type of collar which may be worn by animals, particularly applicable to dogs and cats. The collar 60 includes a buckle 62 at one end and holes 64 at the other as a means of retaining the collar on the neck of an animal. The collar 60 includes a pouch 66 in much the same manner as the pouch 22 of the ear tag illustrated in FIG. 7. Positioned in the pouch 66 is the chemical containing vial 10 having a wick 14 extending therefrom. It can be readily appreciated that the amount of chemical which can be contained even in a small vial will be substantially greater than that normally dispensed by the commercially available tick and flea collars presently marketed for use on dogs and cats. In addition, the vial 10 can be replaced as required. Further, the dispensation of chemical will be at a more constant rate than with the presently available tick and flea collars.

FIGS. 1 through 7 demonstrate examples of methods whereby the chemical agent containing vial may be secured to the exterior of the body of an animal by means of an ear tag. FIG. 12 illustrates a method in which the vial may be employed without an ear tag. In this arrangement the vial 10D contains an integral extending planar portion 68 having an opening 70 therein. The opening 70 may be simply formed in the planar portion 60 or may be formed by means of an integral, tubular portion 72 as illustrated. The use of tubular portion 72 is advantageous in that it reduces the possibility of the planar portion 68 being ripped out when the device is in use. To attach the vial 10D to an animal's ear, a male retention portion 74 is employed. The retainer includes a large diameter base portion 76 and an integral elongated pin member 78. The pin member is pointed at the outer end 80. The pointed end includes an enlarged diameter portion 82. The pointed end of the pin portion is forced through the animal's ear and thence through the opening 70 in the vial planar portion 68. The enlarged diameter portion 82 passes through the opening 70 but will not easily pass rearwardly therethrough; thus the vial is retained on the animal's ear.

The invention describes various means of dispensing minute quantities of chemicals from a vial and various means of utilizing such vial by attaching it to the exterior of an animal's body. Such commercially available insecticides and insect repellent chemicals are very effective even when administered in very minute quantities. Therefore, even a small vial can contain sufficient chemical to act as an effective agent to eradicate or dispel ticks, fleas and other insects for an extended period of time.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed:

1. Apparatus for sustained dispensation of a chemical agent exteriorally of the ear of an animal comprising:
   a tag;
   means of attaching the tag to the ear of an animal;
   a small closed vial having a chemical agent therein;
   a wick of small cross-sectional dimensions extending sealably from the interior to the exterior of said vial; and
   means of attaching said vial to said tag, said vial and tag being of dimensions such that said vial and wick remain substantially within the confines of and adjacent to the animal's ear to which the tag is affixed.

2. Apparatus according to claim 1 wherein said ear tag has a pouch formed thereon, said vial being received in said pouch.

3. Apparatus according to claim 1 wherein said ear tag is of relatively thin material having a reduced width neck portion, the neck portion being attached to the ear of an animal, and wherein said vial has a circumferential flexible band extending therefrom, the band being received around said ear tag reduced width portion.

4. Apparatus according to claim 1 wherein said ear tag has an elongated slot therethrough, and wherein said vial has an attachment member extending therefrom, the attachment member having an intermediate portion of width equal to or less than said slot and an outer portion having a width equal to or less than said slot and of length greater than the width of said slot, said outer portion being extendable through said slot in one orientation but retained by said ear tag in the normal orientation of said vial while in use.

5. Apparatus for sustained dispensation of a chemical agent exteriorally of the ear of an animal, comprising:
   a small vial of plastic material having an extending portion;
   means of attaching said extending portion to the ear of an animal; and
   a wick of small cross-sectional dimensions extending sealably from the interior to the exterior of said vial, said vial, including said extending portion and said wick being dimensioned such that they remain substantially within the confines of and adjacent to the animals ear to which the vial is attached.

6. Apparatus according to claim 5 wherein said vial extending portion has an opening therethrough and wherein said means of affixing said vial extending portion to the ear of an animal includes an elongated pin member having a pointed end which can be forced through the ear of an animal and thence through said opening in said vial extending portion, the pin member having an enlarged portion adjacent the pointed end whereby said vial extending portion is retained on said pin.

7. Apparatus for sustained dispensation of a chemical agent exteriorally of an animal's body comprising:
   a small closed vial containing chemical agent and having a conduit portion extending from the interior to the exterior of the vial;
   a spherical member of substantially the interior diameter of said conduit normally sealing said conduit against the passage of chemical agent therethrough, said spherical member being moveable within said conduit; and
   means of limiting the movement of said spherical member within said conduit, the movement of said spherical member within said conduit serving to dispense minute portions of chemical agent.

8. Apparatus for sustained dispensation of a chemical agent exteriorally of an animal, such as a dog or cat, comprising:

a collar for fitting about the neck of an animal, said collar having a pouch formed thereon;
a small closed vial means containng a chemical agent, the vial means having an apperature therein;
a wick of small cross-sectional dimensions extending sealably from said vial means through said apperature;
wherein said vial means is received in said pouch and the dimensions of said vial means and wick being relatively small compared to said collar whereby the orientation of said vial means relative to the animal is substantially immaterial.

9. The apparatus according to claim 8 wherein said vial means is dimensioned to provide a volumn corresponding to a vial of substantially about $\frac{1}{2}$ to $\frac{3}{4}$ inches in length and substantially about 3/16 to $\frac{1}{4}$ inches in diameter.

* * * * *

UNITED STATES PATENT AND TRADEMARK OFFICE
CERTIFICATE OF CORRECTION

PATENT NO. : 4,506,630
DATED : March 26, 1985
INVENTOR(S) : Jakie A. Hair

It is certified that error appears in the above-identified patent and that said Letters Patent is hereby corrected as shown below:

```
Claim 2, line 2, after "vial" insert --means--.
Claim 3, line 4, after "vial" insert --means--.
Claim 4, lines 3 and 10, after "vial" insert --means--.
Claim 6, lines 1, 3, 7 and 9, after "vial" insert --means--.
Claim 1, lines 5, 8, 9 and 10, after "vial" insert --means--.
Claim 5, lines 3, 8, 9 and 12, after "vial" insert --means--.
Claim 7, lines 3 and 5, after "vial" insert --means--.
```

Signed and Sealed this

Twelfth Day of November 1985

[SEAL]

Attest:

Attesting Officer

DONALD J. QUIGG

Commissioner of Patents and Trademarks